US012734492B2

(12) United States Patent
Kirchmair

(10) Patent No.: US 12,734,492 B2
(45) Date of Patent: Sep. 15, 2026

(54) METHOD AND ARRANGEMENT FOR MIXING A LIQUID

(71) Applicant: Single Use Support GmbH, Kufstein (AT)

(72) Inventor: Johannes Kirchmair, Brandenberg (AT)

(73) Assignee: SINGLE USE SUPPORT GMBH, Kufstein (AT)

( * ) Notice: Subject to any disclaimer, the term of this patent is extended or adjusted under 35 U.S.C. 154(b) by 1070 days.

(21) Appl. No.: 17/831,783

(22) Filed: Jun. 3, 2022

(65) Prior Publication Data

US 2022/0331761 A1 Oct. 20, 2022

Related U.S. Application Data

(63) Continuation of application No. PCT/AT2020/060405, filed on Nov. 17, 2020.

(30) Foreign Application Priority Data

Dec. 5, 2019 (AT) ................................. 51064/2019

(51) Int. Cl.
*B01F 31/24* (2022.01)
*A61J 1/10* (2006.01)
(Continued)

(52) U.S. Cl.
CPC ................ *B01F 31/24* (2022.01); *A61J 1/10* (2013.01); *A61J 1/20* (2013.01); *B01F 35/513* (2022.01); *B01F 2215/0422* (2013.01)

(58) Field of Classification Search
CPC .............................. B01F 31/24; B01F 35/513
(Continued)

(56) References Cited

U.S. PATENT DOCUMENTS 16,766 A * 3/1857 Walcott .................... C12C 7/17 24/40
63,580 A * 4/1867 Thorn .................... B01F 31/24 366/240
(Continued)

FOREIGN PATENT DOCUMENTS

DE 1 101 692 3/1961
DE 10 2013 107 935 4/2014
(Continued)

OTHER PUBLICATIONS

International Search Report issued Feb. 16, 2021 in International (PCT) Application No. PCT/AT2020/060405.

*Primary Examiner* — David L Sorkin
(74) *Attorney, Agent, or Firm* — Wenderoth, Lind & Ponack, L.L.P.

(57) ABSTRACT

A method is provided for mixing a liquid in a closed container having at least one axis of symmetry, and the container is arranged such that the at least one axis of symmetry lies substantially in a vertical plane intersecting a horizontal plane of a surface of a shelf. The container is moved in an oscillating manner along a movement path that appears linear when the horizontal plane is viewed from above. In order to generate at least one vortex in the liquid, the container is oriented such that the movement path and the at least one axis of symmetry are different when the horizontal plane is viewed from above.

20 Claims, 2 Drawing Sheets

(51) Int. Cl.
*A61J 1/20* (2006.01)
*B01F 35/513* (2022.01)

(58) Field of Classification Search
USPC .................................................. 366/212, 240
See application file for complete search history.

(56) References Cited

U.S. PATENT DOCUMENTS

| | | | | |
|---|---|---|---|---|
| 95,703 | A * | 10/1869 | Martin | C12C 7/17 99/277.2 |
| 5,346,303 | A | 9/1994 | Heinonen et al. | |
| 5,918,979 | A | 7/1999 | Martin et al. | |
| 6,299,344 | B1 | 10/2001 | Tannenbaum | |
| 7,195,394 | B2 | 3/2007 | Singh | |
| 9,597,645 | B2 | 3/2017 | Takenaka et al. | |
| 2004/0233779 | A1 * | 11/2004 | Zambaux | B01F 35/514 366/214 |
| 2006/0013063 | A1 | 1/2006 | Singh | |
| 2007/0195642 | A1 | 8/2007 | Singh | |
| 2009/0233334 | A1 | 9/2009 | Hildinger et al. | |
| 2010/0172203 | A1 | 7/2010 | Singh | |
| 2014/0016431 | A1 | 1/2014 | Takenaka et al. | |
| 2016/0175790 | A1 | 6/2016 | McCarley et al. | |

FOREIGN PATENT DOCUMENTS

| | | |
|---|---|---|
| EP | 0 569 214 | 11/1993 |
| GB | 816960 | 7/1959 |
| JP | 62-65724 | 3/1987 |
| WO | 98/37955 | 9/1998 |
| WO | 2009/114442 | 9/2009 |

* cited by examiner

METHOD AND ARRANGEMENT FOR MIXING A LIQUID

BACKGROUND OF THE INVENTION

The present invention relates to a method for mixing a liquid which is present in a closed container, as well as an arrangement consisting of a device for mixing a liquid present in a closed container and the container with the liquid.

Flexible disposable containers for liquids are increasingly being used in production processes for pharmaceutics and biotechnology. These flexible disposable containers are also called single-use bags. Compared with rigid containers, made from stainless steel for example, such flexible disposable containers offer many advantages. First, they are supplied clean and sterile, thus do not need to be cleaned and sterilized. Second, they can be disposed of after use and therefore do not need to be cleaned after use. Moreover, time-consuming steps for validating the sterility and cleanliness, as are necessary for rigid containers, are dispensed with.

However, a challenge presented by flexible disposable containers is the mixing of liquids which are present inside the sealed flexible container. Opening the flexible containers in order to mix the contents is specifically not desired, naturally, as this would negate the advantages relating to the sterility of the flexible disposable containers.

Rotating shafts by means of which powerful mixers are driven can therefore only be introduced into the flexible containers with great difficulty. The sealing of the shaft presents a significant problem in this regard.

Agitators to be driven magnetically can be introduced into the flexible container in the manufacturing process before sterilization. However, the degree of (mixing) power that can be introduced into the liquid by using them remains limited.

The methods described above are mechanically very complex, technically time-consuming and require a large amount of space. In particular in applications such as for example fractionation processes, wherein many fractions must be mixed, the mixing systems described above do not offer an acceptable solution because of the large amount of space required and the complex and technical outlay.

Further devices known for the purpose of mixing liquids present in closed containers use the inertia principle in order to induce movements of the liquid inside the container by moving the container. In principle, these devices can be divided into devices which generate linear movement paths for the container when the horizontal plane is viewed from above and those which generate more complex movement paths. The former are naturally preferred in practice because the simpler movement path that appears linear when viewed from above can be realized with simpler constructions which are therefore lower maintenance and more durable.

Constructions for example with rockers and similar by means of which waves are to be generated which are to promote mixing are known (see for example U.S. Pat. No. 7,195,394 B2 or WO 2009/114442 A1).

However, it would be more conducive to mixing if a vortex could be induced in the liquid instead of waves. This was proposed in US 2010/0172203 A1. However, asymmetrically shaped containers were used to generate the vortexes. These asymmetrical containers are naturally more difficult to produce than symmetrical containers, for which reason this system ultimately did not gain acceptance because it is uneconomical.

Against this background, the object of the present invention is to provide a method and an arrangement for mixing liquids present in closed containers, wherein for one thing symmetrical containers can be used and for another vortexes in the liquid can be used for the mixing.

SUMMARY OF THE INVENTION

To achieve this object, the container is oriented such that the movement path and the at least one axis of symmetry are different when the horizontal plane is viewed from above, in order to generate at least one vortex in the liquid.

With respect to the arrangement, the object is achieved in that the container is oriented such that the movement path and the at least one axis of symmetry are different when the horizontal plane is viewed from above.

To induce a vortex in the liquid, ultimately a non-symmetrical situation must be produced in the container. A central finding of the invention is that the symmetry of the container and the symmetry of the device for moving the container along the movement path need not be broken by requiring the container or device itself to have an asymmetrical shape. Instead, the skilful orientation or arrangement of the container relative to the device can be used in order to induce a vortex in the liquid.

Thus, the invention combines a particularly good mixing of the liquid inside the closed container with a method that is particularly simple to execute. In other words, the invention combines a particularly good mixing of the liquid inside the closed container with a particularly simple construction of the device for moving the container.

The device for moving the container and thus for mixing the liquid can therefore also be housed in a relatively small amount of installation space/storage space.

By "liquids" is meant within the meaning of the invention all substances or substance mixtures which contain a liquid portion, thus e.g. also suspensions or emulsions.

The axis of symmetry of the container lies within a vertical plane of symmetry extending through the horizontal plane such that a mirror symmetry is present when the horizontal plane is viewed from above. Naturally, further symmetries of the container can be present.

However, according to the invention, preferably there are no axes of symmetry of the container which coincide at least partly—preferably fully—with the projection of the movement path onto the horizontal plane (naturally excluding mere points of intersection) when the horizontal plane is viewed from above. In other words, the container according to the invention is to be oriented such that it is asymmetrical relative to the movement path.

Through the orientation or arrangement of the container according to the invention, "angled" contours are produced inside the container which deflect the liquid from the direction of the movement path and thereby generate the vortex.

An "oscillating movement" means a substantially repeating movement which runs along the movement path. A simple example would be a linear movement which runs back and forth between two points in the horizontal plane. However, certain rocking movements about a horizontal axis also repeat naturally and appear linear when the horizontal plane is viewed from above.

The fact that the movement path appears horizontal when viewed from above can for example be understood to include the meaning that the projection of the movement path onto the horizontal plane is linear.

Other movements can be overlaid in addition to the movement that appears linear when viewed from above, provided that at least a part of the movement path still appears linear when the horizontal plane is viewed from above.

The container can include additional functional elements, such as for example connectors and/or handles. The presence according to the invention of the axis of symmetry naturally relates only to the (inner) part of the container holding the liquid. Within the framework of the invention, there are naturally no restrictions on externally arranged additional elements of the container, provided the orientation or arrangement according to the invention on the device is possible.

The container is arranged according to the invention such that the vertical plane of the axis of symmetry (vertical plane of symmetry) extends through (intersects) the horizontal plane, or the axis of symmetry lies substantially in the horizontal plane. The deviation may not be so great that no vortex is induced in the liquid at all.

The container can be oriented such that the at least one axis of symmetry and the movement path form an angle of between 5° and 85°, preferably between 10° and 60° and particularly preferably between 20° and 40°, when the horizontal plane is viewed from above. Quite particularly preferably, the container can be oriented such that the at least one axis of symmetry and the movement path form an angle of 30° when the horizontal plane is viewed from above.

If the container has more than one axis of symmetry when viewed from above, the preferred angular relationship, when the horizontal plane is viewed from above, can be between the movement path and the axis of symmetry along which the container has a longer, in particular the longest, extent.

When viewed from above, the container can have the basic shape of a rectangle, an isosceles trapezium or a combination of a rectangle and an isosceles trapezium.

Particularly preferably, the container is used only partly filled, with the result that a gas cushion—in particular an air cushion—is present in the container in addition to the liquid. Thereby, both the effect according to the invention of at least one vortex in the liquid and the tumbling wave movements of the liquid in the air cushion can be used for mixing the liquid, which can ensure optimal mixing in a short period of time.

In a particularly simple design of the invention, when viewed from above the container can be moved exclusively linearly in an oscillating manner.

In addition, the container can be moved exclusively in the horizontal plane. This does not mean that the container would have to be arranged completely planar (that would be impossible because the container is a three-dimensional object). Instead, the movement in the horizontal plane means that the (imaginary) movement curve of the container lies in the (imaginary) horizontal plane.

One embodiment of the invention in which an exclusively linear movement is used which takes place exclusively within the horizontal plane can be particularly preferred.

A flexible bag—preferably made of plastic—can be used as a container. In particular, a so-called single-use bag can be used. The latter can be made of two films which are welded along an edge, for example.

Such bags are substantially flat when empty. Naturally, other containers which have a significant height even when empty can also be used within the framework of the invention.

The container can be placed on at least one shelf of the device for mixing the liquid in the container and oriented or arranged accordingly.

The method according to the invention can be carried out with several containers simultaneously. All measures which are taken in relation to one container can also be taken in relation to a plurality of containers.

The execution of the method according to the invention with several containers simultaneously can particularly preferably be realized in that there are several shelves arranged one above the other and several containers at least partly filled with a liquid to be mixed are placed on the shelves. This measure can also be particularly advantageous in respect of the space required for the device.

A transport shell can be located in each case between the container—in particular single-use bag—and the shelf. The transport shells can particularly preferably be formed such that they form the shelf for the container arranged or to be arranged above it (there is no separate shelf, and the transport shells form a support shelf). In other words, the containers can be stacked—preferably by means of transport shells—for the mixing according to the invention with or without a separate shelf.

A medicinal product or a precursor and/or intermediate occurring in a pharmaceutical or biotechnology production process can particularly preferably be used as liquid within the framework of the method according to the invention. In other words, the method according to the invention can be used for medicinal products or generally in a pharmaceutical or biotechnology production process.

Examples of specific applications of the invention would be the homogenization of buffer solutions and the mixing of precipitated material in the liquid.

BRIEF DESCRIPTION OF THE DRAWINGS

Further advantages and details of the invention will be revealed below with reference to the drawings, in which:

FIGS. 1*a* and 1*b* represent an arrangement according to the invention consisting of a device 10 for mixing a liquid 1 present in the container 2 schematically from above (FIG. 1*a*) and schematically in section (FIG. 1*b*).

Figure 1A:
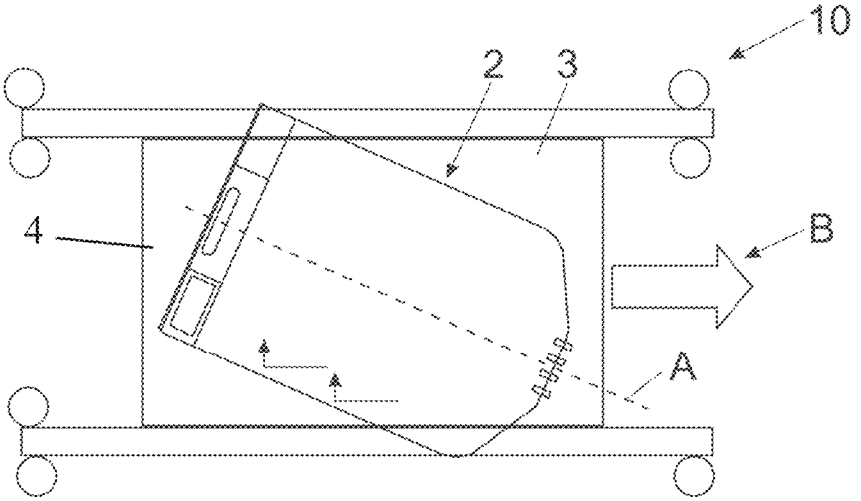
FIG. 1*a* is a schematic diagram of an arrangement according to the invention shown from above.

The view from above is directed onto a horizontal plane 3 (substantially the drawing plane) formed by a shelf 4 for supporting the container 2.

The container 2 (in this embodiment, a single-use bag) is shaped as a rectangle combined with a flat isosceles trapezium with an interior containing the liquid 1. In addition, the container 2 has some functional elements on the outside such as, for example, hose connectors and a holding ring.

DETAILED DESCRIPTION OF THE INVENTION

However, the container 2 holding the liquid 1 is substantially mirror-symmetrical relative to an axis of symmetry A lying in a vertical plane extending through the horizontal plane 3.

The device 10 is designed for moving the container 2, as a result of which the mixing of the liquid 1 takes place. The movement path B is indicated by an arrow. An exclusively linearly oscillating movement takes place within the horizontal plane 3. Alternatively, however, the indicated movement could also be realized, for example, by a rocker or similar.

Figure 4:
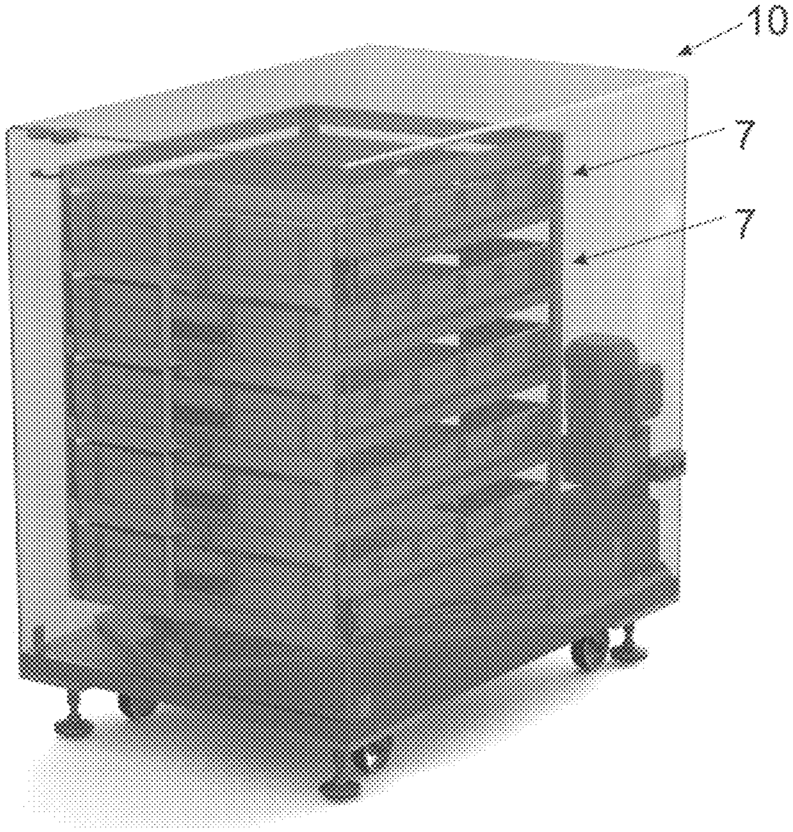
FIG. 4 shows an arrangement according to the invention for mixing liquids present in several containers.

Devices known in principle in the state of the art can be used to generate the exclusively linear movement. Racks and a drive (for example an electric drive) with an eccentric can be used. An example is indicated in FIG. 4.

The drive and/or its control system can be designed such that the repeating movement along the movement path B is repeated 5 to 120 times per minute. This speed can be adjustable.

As can easily be seen from the view from above (plan view of the container 2 and shelf 3 shown in FIGS. 1*a* and 2*b*), the axis of symmetry A and the movement path B form an acute angle of between 20° and 40° (30° in this embodiment). Through the action of the margins holding the liquid 1 and their angled arrangement relative to the movement path B, a deflection effect is achieved which results in the formation of a vortex within the liquid 1. Both the deflection action of the container margins and the vortex are indicated graphically in FIG. 1*a*.

Figure 1B:
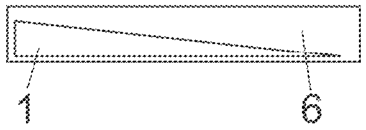
FIG. 1*b* is a schematic section view of the arrangement from FIG. 1*a*.

As can be seen from the sectional representation in FIG. 1*b*, the container 2 is used only partly filled, with the result that a gas cushion 6—air in this embodiment—is present inside the container in addition to the liquid 1. This makes it possible to cause a wave formation (represented schematically in FIG. 1*b*) in the container 2. The mixing action of the vortex is further increased by the waves tumbling according to the intensity of the movement generated by the device. The device 10 has not been represented in FIG. 1*b* for the sake of clarity.

Figure 2A:
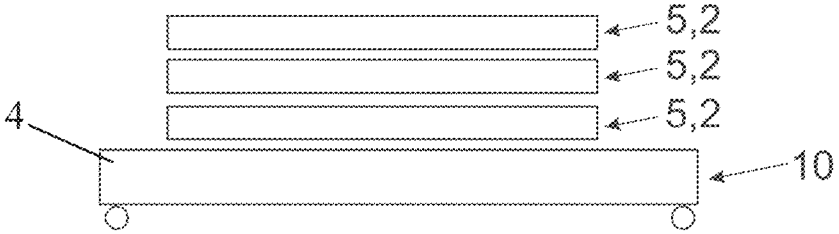
FIG. 2*a* is a schematic side view of an arrangement according to the invention with stacked containers.
Figure 2B:
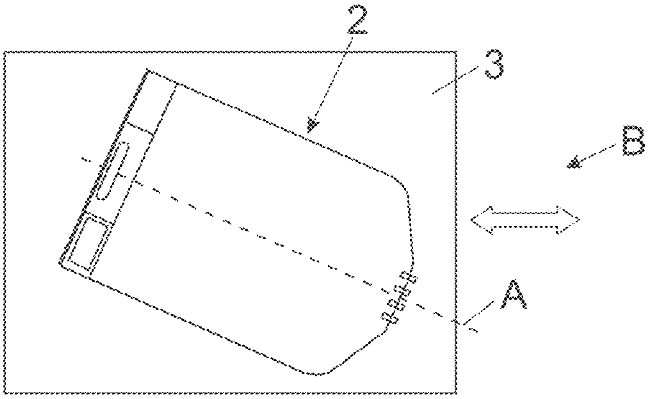
FIG. 2*b* is a top view of the arrangement according to FIG. 2*a*.

An embodiment of an arrangement according to the invention, wherein the containers 2 are arranged inside transport shells 5, is represented in FIGS. 2*a* and 2*b*. The transport shells 5 are stackable on the shelf 4 of the device 10 (i.e., each transport shell 5 is between the respective container 2 and the shelf 4). By stacking several containers 2, at least partly filled with liquid 1, in transport shells, liquid 1 in several containers 2 can be mixed simultaneously with one device 10 (for example as from FIG. 1*a*).

The arrangement of the containers 2 on the respective shelf 4 (which forms the horizontal plane 3) according to the embodiment of FIGS. 2*a* and 2*b* is analogous to that from FIG. 1*a*. This means that the axis of symmetry A of the containers forms an angle with the movement path B (indicated by an arrow).

Figure 3:
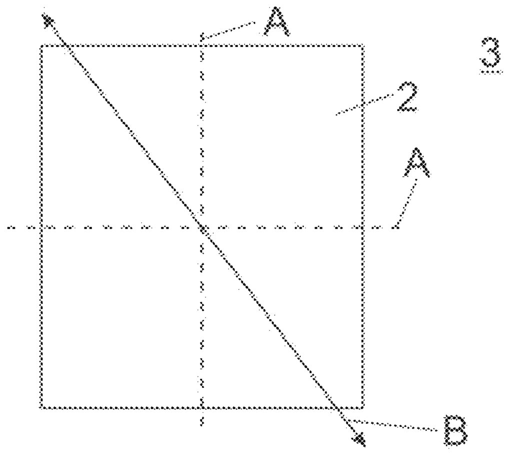
FIG. 3 is a schematic top view of an arrangement according to the invention.

FIG. 3 shows purely schematically an embodiment in which the container 2 has two different axes of symmetry A in a vertical plane extending through the horizontal plane 3. When the horizontal plane 3 is viewed from above, the movement path B is arranged at an angle relative to both axes of symmetry A. In particular, the angle between the movement path B and the axis of symmetry A in FIG. 3 along which the container has the longer extent is between 20° and 40°.

FIG. 4 represents an embodiment with several containers 2 arranged one above the other. The containers 2 are arranged in transport shells 7 (the containers 2 themselves are thereby not clearly visible) so that the transport shells 7 form a support shelf (there is no separate shelf). A rack system with a drive can be seen (underneath the transport shells 7) by which the orientation according to the invention between movement path B and axis of symmetry A relative to each other is achieved.

The embodiment according to FIG. 4 is designed as a mobile trolley with wheels.

Supports are present which can be used to keep the trolley still during the mixing of the liquid.

The invention claimed is:

1. A method for mixing a liquid in a closed container having at least one axis of symmetry, the method comprising:

arranging the container in a transport shell supported on a surface of a shelf such that the at least one axis of symmetry lies in a vertical plane intersecting a horizontal plane defined by the surface of the shelf, and moving the transport shell, the shelf, and the container in an oscillating manner along a movement path, the movement path being linear when the horizontal plane is viewed from above, wherein the container is oriented such that the movement path and each of the at least one axis of symmetry form an angle when the horizontal plane is viewed from above to generate a vortex in the liquid within the container during the oscillating movement, and wherein the transport shell is located between the container and the shelf.

2. The method according to claim 1, wherein the container is oriented such that the at least one axis of symmetry and the movement path form an angle in a range of between 5° and 85° when the horizontal plane is viewed from above.

3. The method according to claim 1, wherein, when viewed from above, the container is shaped as a rectangle, an isosceles trapezium, or a combination of a rectangle and an isosceles trapezium.

4. The method according to claim 1, wherein the container is only partly filled with the liquid so that a gas cushion is present in the container in addition to the liquid.

5. The method according to claim 1, wherein, when viewed from above, the container is moved exclusively linearly in an oscillating manner.

6. The method according to claim 1, wherein the container is moved exclusively along the moving path parallel to the horizontal plane.

7. The method according to claim 1, wherein the container is a flexible bag.

8. The method according to claim 1, wherein the container is one of a plurality of containers each having at least one respective axis of symmetry, and a portion of the liquid is present in each of the plurality of containers, wherein:

each of the plurality of containers is arranged such that each of the at least one respective axis of symmetry lies in a respective vertical plane intersecting the horizontal plane, all of the plurality of containers are moved in an oscillating manner along the movement path, the movement path being linear when the horizontal plane is viewed from above, and all of the containers are oriented such that the movement path and the at least one axis of symmetry of each of the plurality of containers form an angle when the horizontal plane is viewed from above.

9. The method according to claim 1, wherein the liquid is a medicinal product or a precursor and/or intermediate occurring in a pharmaceutical or biotechnology production process.

10. The method according to claim 1, wherein the container is oriented such that the at least one axis of symmetry and the movement path form an angle in a range of between 10° and 60° when the horizontal plane is viewed from above.

11. The method according to claim 1, wherein the container is oriented such that the at least one axis of symmetry and the movement path form an angle in a range of between 20° and 40° when the horizontal plane is viewed from above.

12. The method according to claim 4, wherein the gas cushion is an air cushion.

13. The method according to claim 7, wherein the flexible bag is made of plastic.

14. A method for mixing a liquid in a closed container having at least one axis of symmetry, the method comprising:

arranging the container in a transport shell such that the at least one axis of symmetry lies in a vertical plane intersecting a horizontal plane defined by a surface of the transport shell on which the container is supported, and moving the transport shell and the container in an oscillating manner along a movement path, the movement path being linear when the horizontal plane is viewed from above, wherein the container is oriented such that the movement path and each of the at least one axis of symmetry form an angle when the horizontal plane is viewed from above to generate a vortex in the liquid within the container during the oscillating movement.

15. The method according to claim 14, wherein the container is oriented such that the at least one axis of symmetry and the movement path form an angle in a range of between 5° and 85° when the horizontal plane is viewed from above.

16. The method according to claim 14, wherein, when viewed from above, the container is shaped as a rectangle, an isosceles trapezium, or a combination of a rectangle and an isosceles trapezium.

17. The method according to claim 14, wherein the container is only partly filled with the liquid so that a gas cushion is present in the container in addition to the liquid.

18. The method according to claim 14, wherein the container is a flexible bag.

19. The method according to claim 14, wherein the container is one of a plurality of containers each having at least one respective axis of symmetry and being arranged in a respective one of a plurality of transport shells, and a portion of the liquid is present in each of the plurality of containers, wherein:

each of the plurality of containers is arranged such that the at least one respective axis of symmetry lies in a respective vertical plane intersecting a horizontal plane of the respective one of the plurality of transport shells, all of the plurality of containers are moved in an oscillating manner along the movement path, the movement path being linear when the horizontal plane is viewed from above, and all of the containers are oriented such that the movement path and the at least one axis of symmetry of each of the containers form an angle when the horizontal plane is viewed from above.

20. The method according to claim 14, wherein the liquid is a medicinal product or a precursor and/or intermediate occurring in a pharmaceutical or biotechnology production process.

* * * * *